March 27, 1962     D. B. COLLINGS     3,026,921
FLUSH BAR FASTENER
Filed Dec. 5, 1958     2 Sheets-Sheet 1
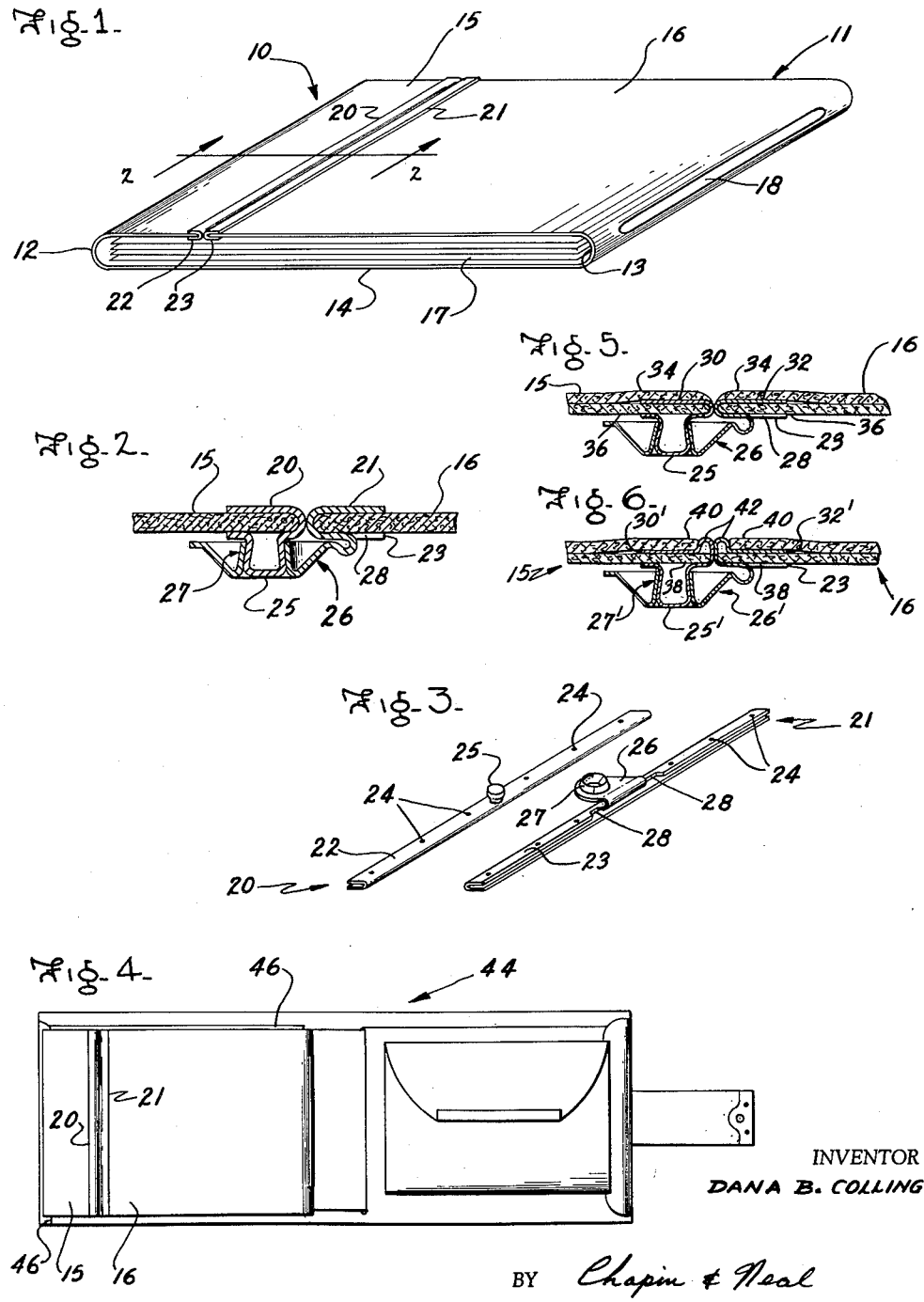
INVENTOR
DANA B. COLLINGS
BY Chapin & Neal
ATTORNEYS March 27, 1962 D. B. COLLINGS 3,026,921
FLUSH BAR FASTENER
Filed Dec. 5, 1958 2 Sheets-Sheet 2
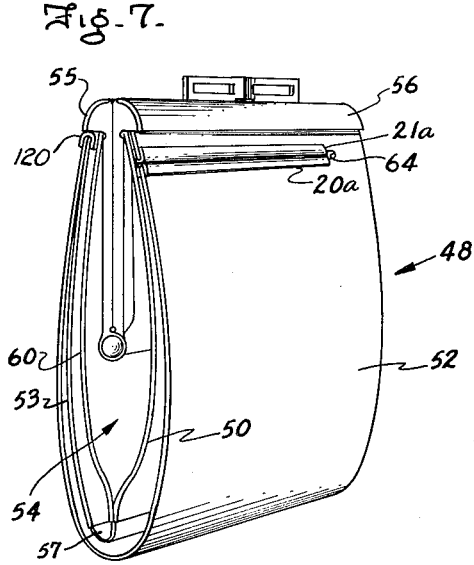
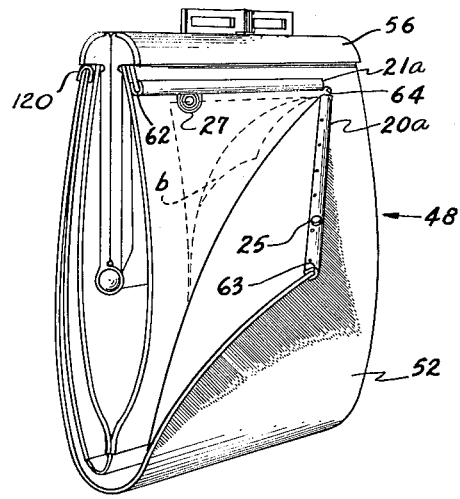
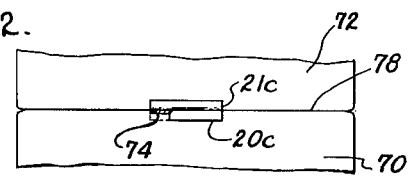
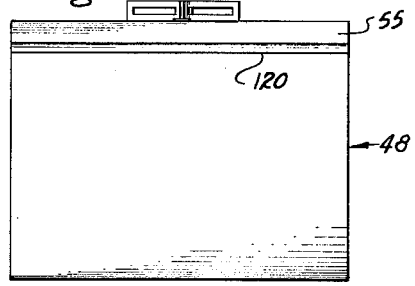
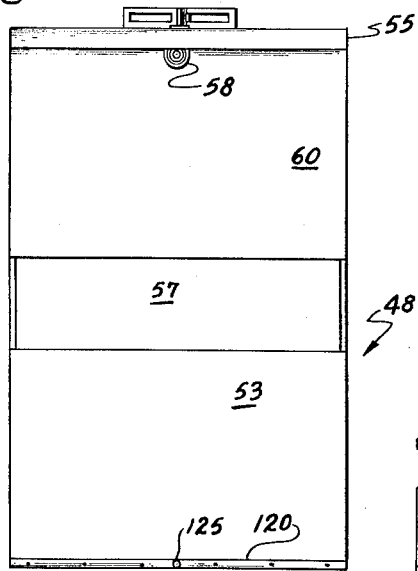
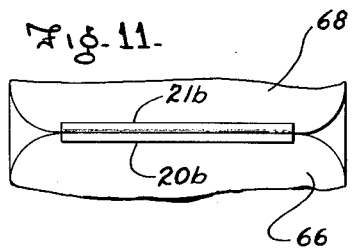
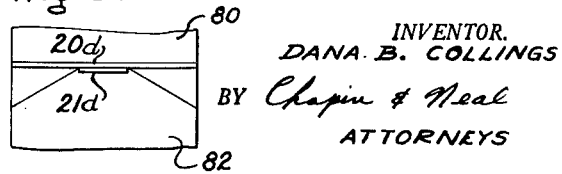
INVENTOR.
DANA B. COLLINGS
BY Chapin & Neal
ATTORNEYS 3,026,921
FLUSH BAR FASTENER
Dana B. Collings, Springfield, Mass., assignor to Buxton, Incorporated, Agawam, Mass., a corporation of Massachusetts
Filed Dec. 5, 1958, Ser. No. 778,466
2 Claims. (Cl. 150—42)

This invention relates to closures and their fasteners and more particularly to fasteners for the closures of card and pass cases, billfolds and the like.

A principal object of the invention is to provide a closure for a receptacle opening and fasteners therefor in which opposing edges of the closure are brought together and secured in edge-to-edge relation in a common plane as distinguished from the conventional closure in which one member overlaps the other and is held by a post and socket snap fastener.

A further object is to preserve certain advantages of the post and socket snap fastener while securing the advantages of the edge-to-edge closure with the closure members in a common plane.

A further object is to reduce the thickness and bulk of receptacles and avoid obstruction of the opening by flaps and similar closure members and to reduce the length of a closure flap where such a construction is necessary.

A further object is to make possible the simplification in the construction of receptacles formed of leather and similar flexible materials.

Other and further objects and advantages will be made apparent in the accompanying drawing and in the following specification and claims.

In the accompanying drawing:

FIG. 1 is a generally perspective view of a pass case, the closure and the fastener of which embody the invention;

FIG. 2 is a sectional detail view substantially on line 2—2 of FIG. 1 and on an enlarged scale;

FIG. 3 is a generally perspective view of the fastener members, separated, and viewed from the bottom;

FIG. 4 is a plan view showing the pass case of FIG. 1 assembled with a billfold;

FIG. 5 is a view similar to FIG. 2 showing an alternative manner of securing the fastener members to the closure members to provide a "blind" connection;

FIG. 6 is a view similar to FIG. 5 showing a modified form of fastener having a beaded edge;

FIG. 7 is a perspective view of a combination change purse and billfold, frequently called a "French purse," embodying the present invention;

FIG. 8 is a perspective view of the French purse shown in FIG. 7 with a wall portion thereof moved to an open position;

FIG. 9 is a plan view of the French purse shown in FIG. 7 with the billfold portion thereof in its unfolded condition;

FIG. 10 is an elevation of the opposite side of the French purse shown in FIG. 7 and with the billfold in a folded condition;

FIG. 11 is a partial showing of an alternate manner of using this invention;

FIG. 12 is an alternate form of this invention; and

FIG. 13 is an additional alternate form of this invention.

Referring to the drawings, 10 generally indicates a pass case comprising a length of leather 11 transversely folded at 12 and 13 to form the rear wall 14 of the case, the front wall being formed by the end portions 15 and 16 of the length 11. The portions 15 and 16 are the closure members for the case by which it is opened and closed. The case encloses a plurality of conventional pass-case envelopes generally indicated at 17 and secured in the case at fold 13 by any suitable or conventional clip 18. The members 15 and 16 are of a length to be brought into approximate abutting edge-to-edge relationship in a common plane to close the case.

The means for releasably securing the free edges of members 15 and 16 in case closing relation comprises channel members 20 and 21 respectively clamped around the opposing end portions of members 15 and 16 and substantially coextensive with the length of the free edges thereof.

The inner flanges or lower portions 22 and 23 of the members 20 and 21 are preferably provided, FIG. 3, with small inwardly struck points, as indicated at 24, to increase the grip of members 20 and 21 on the end portions of members 15 and 16.

The flange 22 of member 20 is formed with a post 25 of a post and socket type of fastener. The flange 23 of member 21 is provided with an extension 26 which is bent over and forwardly of the flange 23, as best shown in FIG. 3, and formed to provide the socket member, as indicated at 27, of a post and socket type fastener.

Flange 23 is preferably cut away at the sides of extension 26, as indicated at 28, to position the socket 27 forwardly of the channel 21 and in position to be engaged by post 25 when the members 15 and 16 are brought into edge to edge engagement in a common plane as in FIGS. 1 and 2. The pass case is thus held closed but may be opened by raising the member 15 and its channel 20 with respect to member 16 and its channel 21.

An alternate method of securing the channel members 20 and 21 to the opposing edge portions of the members 15 and 16 is shown in FIG. 5. The end portions of the members 15 and 16 are of split or double wall construction. Flanges or upper portions 30 and 32 of the channel members 20 and 21 are disposed between the upper and lower portions 34 and 36 of the members 15 and 16. The channel members 20 and 21 are clamped around the lower edge portions 36 in the manner described above. When the post 25 is engaged with the socket 27 the leading edges of the channels 20 and 21 are held in abutting edge-to-edge relation and the members 15 and 16 are disposed in a common plane with the upper portions 34 overlying the flanges 30 and 32.

An alternate form of the channel members 20 and 21 is shown in FIG. 6. These channel members are of generally the same construction as described above and are secured to the lower edge portions 38 of the closure members 15 and 16 in the manner described above, in connection with FIG. 5. The upper portions 40 of closure members 15 and 16 terminate outwardly or short of the edges of the lower portions 38. The channel members include raised beads 42 formed on upper flanges 30' and 32'. The beads 42 extend to a height approximately equal to the thickness of the upper portions 40 of the closure members. Thus, when the post 25' is engaged with the socket 27' of extension 26', the inner edges of the beaded channels are held in abutting edge-to-edge relation with the upper surfaces of the members 15 and 16 and the beads 42 disposed generally in the same plane.

In FIG. 4 the pass case of FIG. 1 is shown in assembled relation with a billfold 44. The rear wall portion 14 (FIG. 1) of the pass case underlies a loop 46 (FIG. 4) of the billfold which holds the pass case in position in the billfold. The closure members 15 and 16 of the case are shown in closed relation and releasably secured by means of the channel members 20 and 21. Since the panels 15 and 16 are disposed in a common plane with the members 20 and 21 engaged in edge-to-edge relation, the pass case closure does not add substantially to the bulk of the billfold.

A combination purse-billfold 48, frequently called a

French purse, is shown in FIGS. 7 to 10 and embodies the present invention. Such combination conventionally provides a bill compartment between an elongated outer wall 52 and a wall formed by panels 50 and 53 connected at their adjacent ends by a stay 57, the side edges of panels 50 and 53 being connected to one longitudinal edge of wall member 52 to form the bottom of the bill compartment. The coin purse compartment is formed between panel 50 and a branch panel member 60, the adjacent side edges of panels 50 and 60 being connected by gusset members 54. As shown in FIG. 9 a socket 58 of the type described above extends downwardly from the inner edge of channel member 55 of the purse frame in which the upper edge of panel 60 is secured. The lower ends of outer wall member 52 and panel 53 are clamped together in the channel of a channel member 20. A post 125 of member 120 is adapted to be releasably engaged with the socket 58 to hold the bill compartment in its folded condition as shown in FIG. 10. In this condition, the upper edge of the member 120 is held in parallel abutting relation with the lower edge of the member 55. The outer surface portions of the member 55 and the channel 120 are disposed substantially in the same plane providing a flush closure for the combination.

The adjacent end edges of outer wall member 52 and panel 50 are clamped together in the channel member 56 of the purse frame. The wall 52 is slit from its free edge to a point short of the bottom of the bill compartment, forming opposing edges 62 and 63 (FIG. 8). A hole 64 may be provided at the lower end of the slit to prevent tearing of the panel material beyond this point. Channel members 20a and 21a are secured to the opposing edge portions 62 and 63 and include the socket and post elements 27 and 25 described above. The channel members 20a and 21a are shown in engagement in FIG. 7 and disengaged in FIG. 8. When the lower portion of the panel 52 is swung to an open position such as shown in FIG. 8, a bill b may be readily selected and removed from the bill compartment without unfolding the billfold as shown in FIG. 9. Preferably, the post and socket elements 25 and 27 are positioned at opposed points which are adjacent the outer ends of the channel members 20a and 21a.

While usually the fastener members of the invention will be coextensive with the width of the closure members they serve, if the closure members, as 66 and 68 of FIG. 11, meet along less than their full width, the length of the members 21b and 20b of the fasteners will be limited to the length of the meeting edge portions. Also as shown in FIG. 12, where, for the sake of appearance or for other reasons it is desirable, the length of members 20c and 21c may be less than the extent of the meeting edges of the closure members 70—72. As there shown the central portions of the meeting edges are recessed, as at 74, to receive the members 20c and 21c, the recessing being sufficient to permit the edges of the closure members outwardly of the members 20c and 21c to abut as at 78 in line with the abutment of the members 20c and 21c. Also the fastener members need not necessarily be of equal length. Where as shown in FIG. 13 the edge of one closure member, as 80, is coextensive with its width, while the other closure member 82 meets the closure 80 over less than its width member 20d may be coextensive with the width of closure 80 and member 21d coextensive with the meeting portion of the edge of closure 82. In any event the connection of the closures is effected in a common plane.

Having thus described my invention what is claimed is:

1. In a pass case and the like having a pair of closure members swingable about spaced hinge lines into coplanar edge-to-edge relation, a fastener comprising a pair of discrete bar members of channel configuration, each bar member including a leading edge and spaced opposed upper and lower walls, said bar members fitted around opposite edge portions of said closure members, one of said bar members including an extension extending outwardly beyond its leading edge in a plane underlying and substantially parallel to its lower wall, said extension including one element of a snap type fastener disposed in a direction perpendicular to the closure member on which said bar member is fitted, said snap fastener element being disposed at a predetermined distance outwardly beyond the leading edge of said one bar member, the other bar member including a second snap fastener element interengageable with the first element and disposed in a direction perpendicular to the closure member on which the latter fastener element is mounted, the second fastener element being disposed inwardly of the leading edge of its bar member a distance not greater than said predetermined distance for interengagement with said first element when said closure members are swung into edge-to-edge coplanar relationship.

2. In a pass case and the like having a pair of closure members swingable about spaced hinge lines into coplanar edge-to-edge relation, a fastener comprising a pair of discrete bar members of channel configuration, each bar member including a leading edge and spaced opposed upper and lower walls, said bar members fitted around opposite edge portions of said closure members, one of said bar members including an extension extending outwardly beyond its leading edge in a plane underlying and substantially parallel to its lower wall, said extension including a socket of a snap type fastener opening in a direction perpendicular to the closure member on the edge of which said one bar member is fitted, said socket being disposed at a predetermined distance outwardly beyond the leading edge of said one bar member, the other bar member including a post element extending downwardly from its lower wall in a direction perpendicular to the closure member on which said post carrying bar is mounted, said post being disposed inwardly of the leading edge a distance not greater than said predetermined distance for interengagement with a socket when said closure members are swung into edge-to-edge coplanar relationship.

References Cited in the file of this patent

UNITED STATES PATENTS

| | | |
|---|---|---|
| 653,773 | Holdredge | July 17, 1900 |
| 839,610 | Lusso | Dec. 25, 1906 |
| 1,177,446 | Rains | Mar. 28, 1916 |
| 1,784,748 | Guigan | Dec. 9, 1930 |
| 1,930,935 | Hiering | Oct. 17, 1933 |
| 2,161,491 | Wachs et al. | June 6, 1939 |
| 2,483,304 | Vogel | Sept. 27, 1949 |
| 2,789,614 | Broughton | Apr. 23, 1957 |

FOREIGN PATENTS

| | | |
|---|---|---|
| 475,439 | Germany | Apr. 25, 1929 |
| 1,128,855 | France | Aug. 27, 1956 |